Figure 1B:
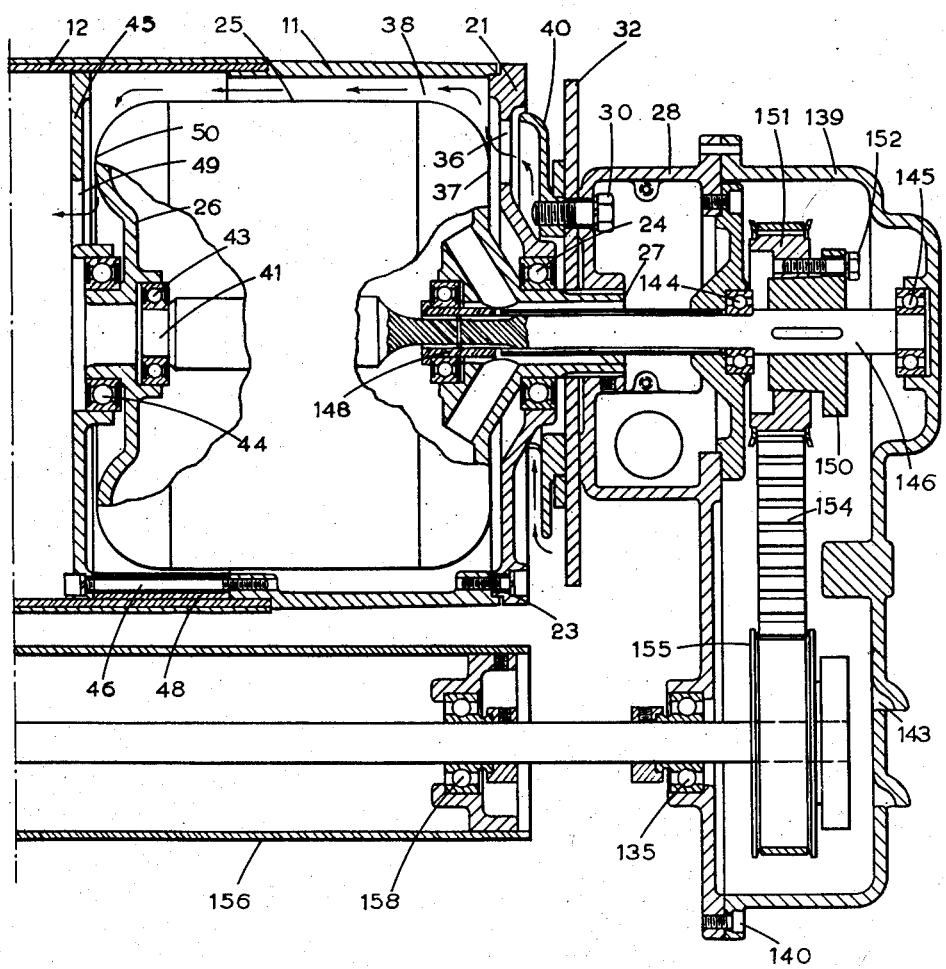

Feb. 5, 1963   J. D. CHRISTIAN   3,076,540
BELT DRIVING DEVICES
Filed Oct. 3, 1960   4 Sheets-Sheet 1
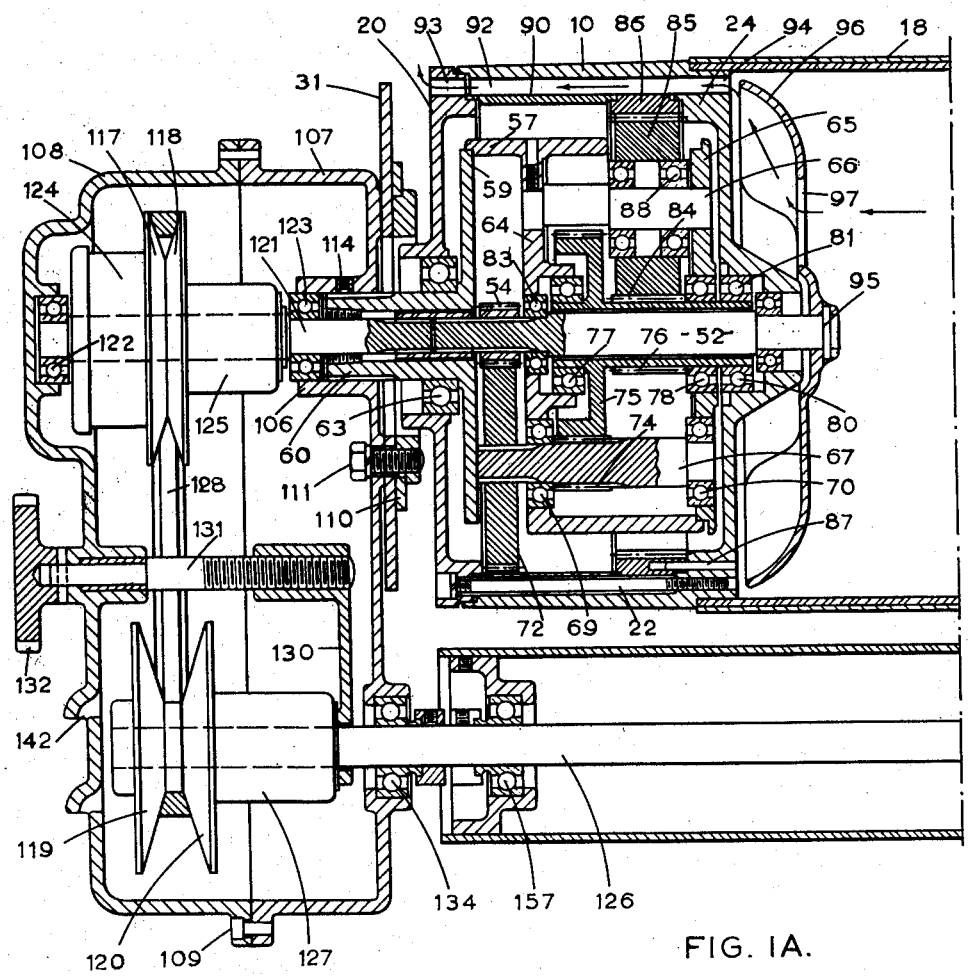
FIG. IA.
INVENTOR
JOSEPH DENNIS CHRISTIAN
BY Irwin S. Thompson
ATTY.

Feb. 5, 1963  J. D. CHRISTIAN  3,076,540
BELT DRIVING DEVICES
Filed Oct. 3, 1960  4 Sheets-Sheet 2

INVENTOR
JOSEPH DENNIS CHRISTIAN
BY Irwin S. Thompson
ATTY.

United States Patent Office 3,076,540
Patented Feb. 5, 1963

3,076,540
BELT DRIVING DEVICES
Joseph Dennis Christian, San Francisco, Calif., assignor to Holo-Flite International Incorporated, San Francisco, Calif.
Filed Oct. 3, 1960, Ser. No. 73,156
8 Claims. (Cl. 198—203)

This invention relates to belt driving devices intended more especially for driving conveyor belts.

There are two main types of belt conveyors viz., package handling conveyors and bulk material handling conveyors. Package handling conveyors are usually flat. Bulk handling conveyors are flat for some materials such as grain, and troughed for most materials such as sand, rock, gravel, etc., etc. Conveyors designed for package handling are usually run on one or the other of two classes of beds, either a glider bed, which is usually a plain piece of formed sheet metal that is flat and over which the belt glides, or a live-bed or roller bed which is usually a plurality of rollers or caster wheels over which the belt rolls. The type of bed that is selected varies according to the duty. It is obvious that if a belt conveyor were designed to carry refrigerators, washing machines or other heavy items, a roller bed would be indicated both to save horsepower and for the proper operation of the belt itself, but if the packages being handled were light cartons such as coffee percolators or toasters or cigarettes a glider bed would serve the purpose.

Belt conveyors that are made with glider beds sometimes have the belt almost to the full width of the bed, for instance, an 18" belt on 19" rollers, but there are other instances where a conveyor bed might be 20" wide and only a 6" or 8" belt used in the middle. Sometimes the belt is handling a product that would tend to roll off the side of the belt, such as, for instance, potatoes, and in that case protective sides are raised up, along side the edges of the belt, to keep the product from rolling off. Sometimes these belts are inclined, frequently as much as 18° to 20°. Other times the belts are declined and other times the belts run perfectly horizontal.

If a belt was designed to handle heavy items such as refrigerators or washing machines or castings, the rollers would be of sturdy construction relatively large in diameter, such as 4", and with relatively heavy shafts and bearings through these rolls to support the load being conveyed. Other times when the product being handled is of very light weight, the roll diameters might be only 1" or 1¼" or 1½" in diameter with correspondingly light weight shafts and bearings.

If a belt is inclined it normally requires more horsepower to drive it than if it is horizontal, but since it is handling the same packages the rollers and shafts and bearings would be the same for an inclined belt as for a horizontal belt, but the drive pulley at the head might have to be larger in diameter, or the motor required to drive this belt and lift this load would be of larger horsepower and, therefore, larger in size.

Belts are driven at various speeds. A belt conveyor may be used in an assembly department carrying small parts that an operator can pick from the belt and in such a case such a belt might be operating as slow as 1 f.p.m. (foot per minute). For normal package handling and conveying the belt speed would be more likely 50 to 60 f.p.m. On the other hand, as granular products are conveyed belt speeds as high as 700 or 1,000 or 1,200 f.p.m. are quite common. A concentrated belt handling bulk rock or gravel would normally run about 300 f.p.m.

A great deal of the cost of any belt conveyor lies in the drive itself, and frequently the engineering that is done cannot accurately determine the final speed or what might be called the optimum speed at which a belt should operate in feet per minute.

Many factors enter into the engineering layout of conveyor plants so it is virtually impossible without an already operating installation of identical nature for an engineer to determine the best operating speeds of a system of conveyors. Such a system of conveyors as, for instance, in an automatic warehouse might require anything from 50 to 150 belt conveyors, synchronized to co-ordinate their functions one with the other, and it is not unusual to have to change or adjust the speed on as many as 75% to 85% of these various conveyors before the total system can be pronounced operable. These adjustments usually involve at least replacement of gears, and sometimes change of motors or pulleys.

The main object of the invention is to provide a belt driving device containing its own motive power between which and the pulley is a driving means capable of being readily adjusted according to required pulley speed over an exceptionally wide range of speeds and power requirements.

A further object of the invention is to ensure adequate ventilation of the pulley when a stock size of pulley is used to accommodate motors of various speeds and in spite of variation in pulley speeds.

Still another object of the invention is to enable the pulley to be readily adjusted to various heights or positions of belt tension.

Figure 2A:
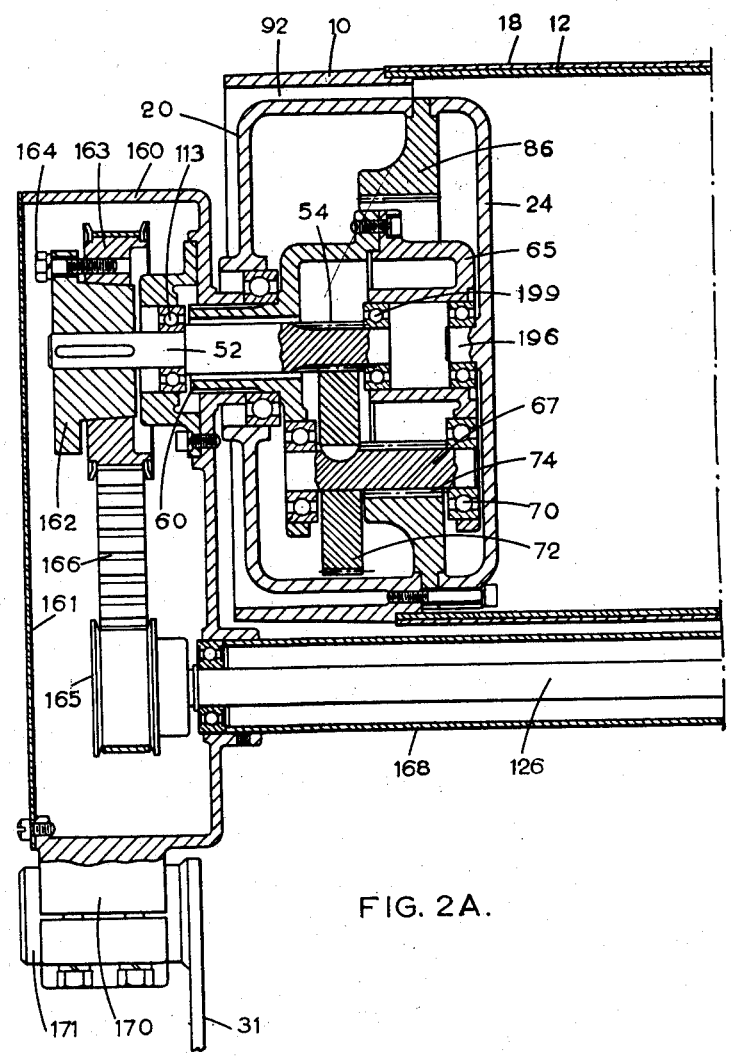
Figure 2B:
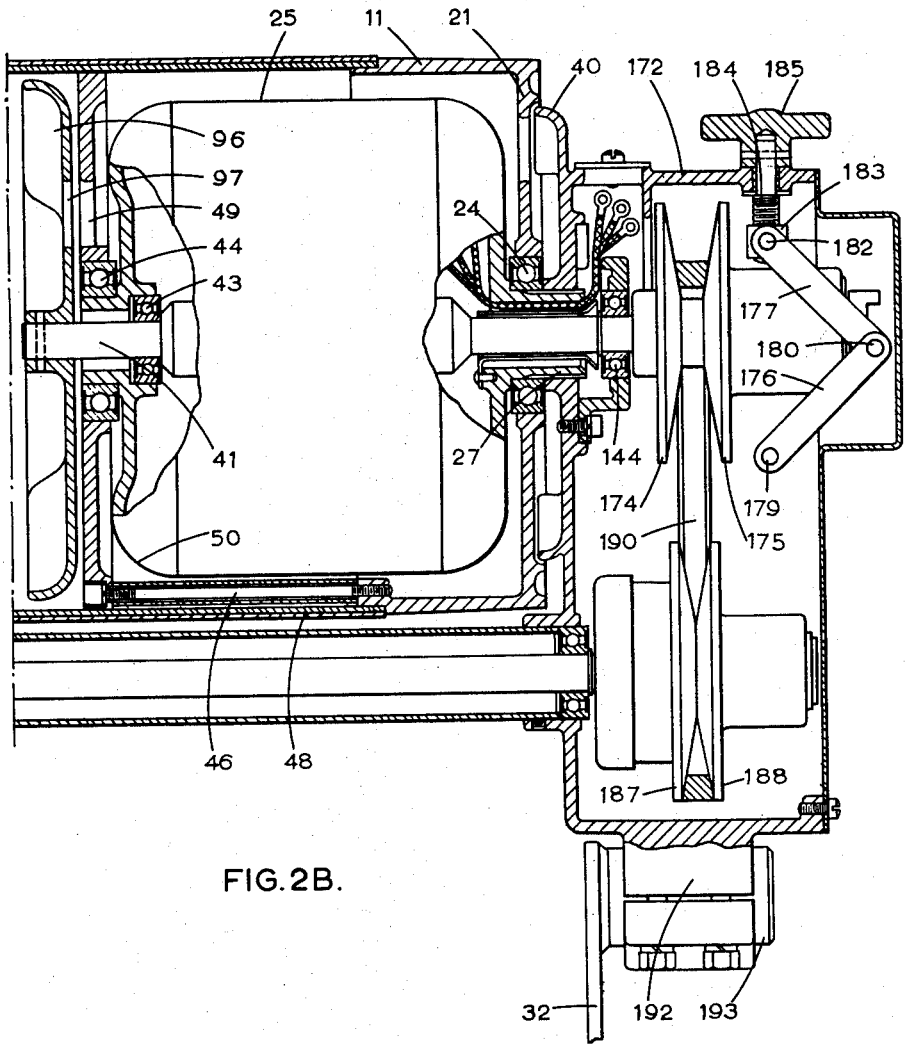

The invention will now be described by way of example with reference to the accompanying diagrammatic drawings wherein:

FIGURE 1 is a sectional view of a belt driving device made in accordance with the invention; and FIGURE 2 is a similar view of another form of belt driven device in accordance with the invention.

The pulley shown in FIGURE 1 comprises a pulley drum made in three parts viz., end parts 10, 11 connected together to form a continuous pulley drum by an intermediate part 12 located between the parts 10, 11 and fixed thereto by pins or other means. The part 12 has a rubber or other coating 18. The parts 10, 11 are of approximately equal length and have end walls, 20, 21 fixed thereto by screws 22, 23.

An electric motor indicated generally by the arrow 25 has a totally enclosed housing 26 which is very desirable in wet or dusty working conditions. The housing 26 has a tubular spigot 27 that passes out of the drum through the wall 21 and carries a bearing 24 on which the pulley drum wall 21 is rotatably mounted. The spigot 27 also carries one part 28 of a housing that is fixed by bolts 30 to one of a pair of spaced apart side plates 31, 32 normally provided in belt conveyor systems. The box 28 receives the ends of the motor conductors and provides connection to a source of power.

The end wall 21 has air flow openings such as 36 spaced from the periphery of the wall 21 so that air entering the drum through said openings contacts the end wall of the motor housing 26 at 37 and is deflected thereby outwardly into an air flow passage 38 provided between the housing and the drum over the whole length of the housing. An air deflector plate 40 carried on the bolts 30 serves to guide air into the openings 36 and prevents entry into the drum of material dropping off the conveyor belt.

The motor spindle 41 is supported by a bearing 43 in the housing 26. The housing 26 carries a bearing 44 on which is mounted an inner wall 45 which supports the drum part 12 and is bolted by bolts 46 to the motor-containing drum part 11 with the interposition of spacer means 48 so that by changing the spacer means the wall 45 can be adjusted axially along the drum part 12 whereby any length of motor can be accommodated.

The wall 45 has air flow openings 49 therein spaced from the periphery of the wall so that the air after traversing the whole length of the housing 26 is caused to flow over the outer end surface 50 of the motor housing for efficient cooling.

Within the drum part 10 is a speed reducing gearing which has a central shaft 52 coaxial with the drum and with the motor shaft and extending completely through the gearing from the motor side of a wall 24 to a position adjacent the outer end of the drum part 10 where it carries a high speed pinion 54. The gearing includes a fixed gear housing 57 that is detachably fixed to a plate 59 on a hollow spigot 60 that extends through the wall 20. The wall 20 is mounted on a bearing 63 carried by the spigot 60.

The gear housing has spaced walls 64, 65 which carry a fixed countershaft 66 and a rotary countershaft 67, the latter being mounted in bearings 69, 70.

The pinion 54 meshes with a gearwheel 72 on the rotary countershaft 67. The pinion 54 and gearwheel 72 are located between the walls 59, 64 so that if the spigot 60 and wall 59 are removed the pinion and gearwheel are at once accessible and can be changed to provide a different ratio without disturbing any parts inside the gear housing 57.

The remaining gears are between the walls 64, 65.

The countershaft 67 carries an integral pinion 74 meshing with a gearwheel 75 that is carried on a sleeve 76. This sleeve is mounted at opposite ends in bearings 77, 78 carried respectively by the walls 64, 65.

The inner end of the sleeve carries a bearing 80 on which the drum wall 24 is mounted. The drum wall 24 carries a bearing 81 in which one end of the shaft 52 is mounted, the other end of this shaft being mounted in a bearing 83 carried by the wall 64.

The sleeve 76 carries an integral pinion 84 that meshes with an idler gearwheel 85 which in turn meshes with internally toothed gear 86 fixed by dowel pins 87 to the drum wall 24. The idler gearwheel is mounted by a bearing 88 on the fixed countershaft 66. A spacer sleeve 90 is disposed between the drum wall 20 and the internal gear 86 and the parts 90, 86 are spaced from the drum part 10 to define an air flow passage 92. The walls 20, 24 have air flow openings 93, 94 therein adjacent the peripheries of these walls communicating with the passage 92.

Mounted on the shaft 52 and fixed thereto by pin 95 is a fan 96 located on the motor side of the wall 24 close to said wall. The fan has air flow openings 97 therein spaced from its periphery and the fan is shaped to impel the air outwardly into the openings 94. Thus, the fan draws air in through the openings 36, over the end surface of the housing 26, over the whole outer surface of the housing, over the outer end surface of the housing, through openings 49, 97, 94, passage 92 to discharge at 93 whereby a continuous flow completely through the drum is achieved thereby providing highly effective cooling and enabling the motor to be used at high rating so that a smaller motor can be used for a given output.

The spigot 60 is located within a boss 106 on a part 107 of a two part housing, the two parts 107, 108 of which are bolted together at 109. The part 107 is clamped by a ring 110 and bolts 111 to the other side frame plate 31 of the conveyor apparatus. The boss 106 carries a grub screw 114 which engages the splined end of the spigot 60.

Two pairs 117, 118 and 119, 120 of separable sheaves are provided in the casing part 108. The sheaves 117, 118 are carried on a spindle 121 mounted in bearings 122, 123 and are urged together by springs (not shown) in casings 124, 125. The sheaves 119, 120 are carried on one end of a layshaft 126 that is parallel to the axis of the drum and extends beyond the drum at each end. The sheave 119 is fixed axially and the sheave 120 is urged away from sheave 119 by a spring (not shown) in a casing 127. An endless belt 128 runs on the two pairs of sheaves. The sheave 120 is adjustable axially in relation to the sheave 119 by arm 130, screw 131, and hand wheel 132 the latter being located outside the casing 107, 108.

The layshaft 126 is mounted in bearings 134, 135. The bearing 134 is carried by the casing 107 and the bearing 135 is carried by the casing part 28 that is fixed by the bolts 30 to the conveyor side frame plate 32. A complementary casing part 139 is fixed to the part 28 by screws 140.

The casing 28, 139 carries bearings 144, 145 for a spindle 146 which is coaxial with the motor spindle and connected thereto by a splined sleeve 148. The spindle 146 carries a hub 150 on which a flanged wheel 151 is fixed by bolts 152. An endless cogged or slatted belt 154 runs over this flanged wheel and over a corresponding flanged wheel 155 on the end of the layshaft 126 opposite to the variable gear end. The wheels 151, 155 provide a 1:1 ratio in this illustrated construction.

The shaft carries a roller 156 on bearings 157, 158.

The casings have air vents 142, 143 to vent the air currents caused by the belts.

It will be seen that the motor drives the layshaft through the wheels 151, 155 and the layshaft drives the input spindle 52 of the pulley through the variable gear 117, 118, 119, 120 and reduction gearing 54, 72, 74, 75, 84, 85, 86.

The device thus makes possible a wide variation of belt speeds and power output without taking down the pulley and in fact whilst the pulley is actually running and driving the conveyor belt.

The fan 96 will always be driven at high speed so that it will ventilate any motor that can be installed in the pulley so long as the motor is not overloaded.

An overloading of the motor beyond the constant torque rating will be indicated by a temperature rise which may operate a thermal cut-out device.

The belts 128, 154 may be replaced by chain drives of the silent or roller type.

A backstop or brake may be mounted within either belt case or on the layshaft or an extension thereof.

In the modification shown in FIGURE 2 the hollow spigot 60 carries a part 160 of a housing that is closed by a flat plate 161. The spindle 52 carries a conical hub 162 on which a flanged wheel 163 is fixed by bolts 164. The layshaft 127 carries a flanged wheel 165 and an endless belt 166 runs over the wheels 163, 165. The layshaft 126 is housed in a fixed tube 168 secured in the housing 160. The housing 160 is fixed by a clamp 170 to a stud 171 carried by the side frame plate 31.

At the other end of the pulley, a housing 172 is made integral with the plate 40 mounted on the hollow spigot 27. The motor spindle 41 carries a pair of sheaves 174, 175 the latter of which is adjustable axially by toggle 176, 177 pivoted at 179 in the housing 172, and connected pivotally at 180 to the hub of the sheave 175. The upper end of the toggle is pivoted at 182 to a nut 183 on a screw 184 that can be rotated by a handle 185 located outside the housing whereby the toggle can be operated to adjust the sheave 175 axially; a complementary pair of sheaves 187, 188 are carried by the layshaft and are spring pressed towards each other. An endless belt 190 runs over the sheaves whereby the motor drives the layshaft at a variable speed according to the drive ratio selected by adjustment of the sheave 175 by rotation of the handwheel 185. The layshaft in turn drives the pulley through the wheels 165, 163 which in this example are of different size to give a step down ratio and through the reduction gearing.

The housing 172 is clamped by clamps 192 to a stud 193 on the side plate 32. The studs 171, 193 are in axial alignment with each other so that the whole pulley can be tilted about the axis of the studs and clamped in adjusted position. The clamps can be utilized:

(a) To adjust the centerline of pulley laterally.

(b) To transversely relate the centerline of the pulley to the belt. This is sometimes desirable in packing tables where the belt will be desired to run at one extreme edge of the table and the space in front of the operator used for the packaging of such items as french fried potatoes.

(c) These adjustments can effect belt takeup or can adjust the linear face of the belt to a fixed discharge point.

(d) Another use of this adjustable hinged clamp is to be able to snub the belt lightly (if desired with a spring tension) against a doctor blade or a cleaning brush.

In FIGURE 2 also a different form of gearing is shown within the pulley. In this construction the fan 96 is fiexed directly on the motor spindle 41. The gear parts 75, 76, 85, 86 of FIGURE 1 are omitted and this is accomplished by making the ring gear 86 extend radially inwards far enough to mesh directly with the gear teeth 74 on the shaft 67. The housing wall 65 carries a bearing 197 in which a spigot 196 is mounted. This spigot is carried centrally by the plate 24 and serves as a bearing for the rotating pulley. The part 65 also carries a bearing 199 for the spindle 52.

An important advantage of this invention is that the portion of the pulley that encloses the motor can be made to take several frame sizes or horsepowers of motor. For instance, one design may accept motors ½, ¾, 1, 1½ and 2 H.P. The other end of the pulley that encloses the gear reduction has a gear reduction rated to take the full load of the largest size motor.

If for example, the gear reduction in the pulley is 30:1 ratio, the variable ratio is 2:1 and the fixed ratio is 2:1, the overall ratio becomes 30×2×2 or 120:1, which is just right for ½ H.P. motor. The speed can be changed by changing the fixed diameter sheaves. If the ratio is set for a total of 120:1 with a 2:1 fixed diameter sheave, the ratio could be changed to 60:1 merely by replacing these sheaves by 1:1 ratio sheave. So by simply changing the fixed diameter pulley anywhere between 2:1 and 1:1, almost stepless change in speeds is accomplished. These pulleys are stock items and it is only necessary to remove a sheet metal cover at one end and slip in a pair of sheaves and belt of desired speed, and it is not necessary at any time to get into the gear reduction itself or inside the pulley. This standardization of production of the gear case represents tremendous economy of manufacture. The variable diameter sheaves and the fixed diameter sheaves are extremely cheap and very easily available.

I claim:

1. A belt driving device comprising a conveyor belt driving drum, means for supporting the drum rotatably, means for supporting an electric motor having a driven spindle within the drum with the said spindle at one end of the drum in axial alignment with the drum, a gearing spindle located at the other end of the drum in axial alignment with the drum and rotatable in relation thereto, gearing within the drum drivably connecting the spindle with the drum, a first fixed housing located outside the drum adjacent the gearing spindle, a variable speed device in said housing including an input shaft and an output shaft parallel to each other and to the drum axis, said output shaft being connected to said gearing spindle, a layshaft outside the drum and parallel to the drum axis and connected at one end to said input shaft, a second fixed housing mounted adjacent the motor end of the drum, and gearing means within said second fixed housing which drivably connect the motor spindle with the other end of the layshaft.

2. A belt driving device as claimed in claim 1, wherein said housings carry means for fixing adjustably on the frame of a conveyor apparatus whereby the housings and drum can be tiltably adjusted on an axis parallel to the drum axis.

3. A belt driving device comprising a conveyor belt driving drum, means for supporting the drum rotatably, means for locating an electric motor within the drum with its spindle projecting out of one end of the drum, support means located outside the drum which carries the motor housing in fixed location, a layshaft disposed parallel to the drum axis on the outside thereof, a reduction gearing located within the other end of the drum, said gearing including a shaft projecting out of said other end of the drum, first transmission means drivably connecting one end of the layshaft to the motor spindle and second transmission means drivably connecting the other end of the layshaft to the gearing shaft, said first and second transmission means being located outside said drum at opposite ends thereof and one of said transmission means being a variable ratio device, said reduction gearing and said first and second transmission means being all operable simultaneously in series connection to transmit drive from the motor spindle to said drum.

4. A belt driving device as claimed in claim 3 wherein the reduction ogearing comprises a pinion on said shaft, a fixed gear housing within the drum and extending out of the drum to a fixed mounting position, a countershaft carried by said gear housing parallel to and offset from the countershaft, a gearwheel on said countershaft in mesh with said first pinion, a pinion on said countershaft, and an internally toothed ring gear fixed to the drum and meshing directly with said pinion on the countershaft.

5. A belt driving device as claimed in claim 3 wherein the layshaft carries a free running roller to engage the belt.

6. A belt driving device as claimed in claim 3 wherein the variable speed device comprises two pairs of expanding conical sheaves drivably connected by a belt, and provided with hand adjusting means for separably adjusting one pair of sheaves.

7. A belt driving device as claimed in claim 3 wherein the transmission means connecting the motor spindle to the layshaft comprises two cog wheels in axial alignment respectively with said motor spindle and layshaft and a toothed belt connecting said cog wheels drivably together.

8. A belt driving as claimed in claim 3 having a fan mounted directly on the gearing spindle.

References Cited in the file of this patent

UNITED STATES PATENTS

| | | |
|---|---|---|
| 990,171 | Summeril | Apr. 18, 1911 |
| 2,852,130 | Wallace | Sept. 16, 1958 |
| 2,966,068 | Christian | Dec. 27, 1960 |